United States Patent

Jabbari et al.

[11] Patent Number: 5,400,197
[45] Date of Patent: Mar. 21, 1995

[54] DISC DRIVE SPINDLE MOTOR

[75] Inventors: Ira J. Jabbari, San Jose; Michael J. Darling, Soquel, both of Calif.

[73] Assignee: Seagate Technology, Inc., Scotts Valley, Calif.

[21] Appl. No.: 893,484

[22] Filed: Jun. 5, 1992

[51] Int. Cl.$^6$ ............................................. G11B 17/02
[52] U.S. Cl. ................... 360/99.08; 360/98.07; 310/67 R; 310/268
[58] Field of Search ............... 360/99.08, 99.09, 99.11, 360/99.07; 310/268, 67 R

[56] References Cited

U.S. PATENT DOCUMENTS

| | | | |
|---|---|---|---|
| Re. 33,813 | 2/1992 | von der Heide et al. | 310/67 R |
| 4,554,473 | 11/1985 | Muller | 310/67 R |
| 4,687,803 | 3/1987 | von der Heide et al. | 310/67 R |
| 4,922,406 | 5/1990 | Schuh | 360/97.03 |
| 4,924,125 | 5/1990 | Clark | 310/67 R |
| 4,943,748 | 4/1990 | Shiozawa | 310/67 R |
| 4,965,476 | 10/1990 | Lin | 310/51 R |
| 5,008,573 | 4/1991 | Beppu et al. | 310/67 R |
| 5,047,677 | 9/1991 | Mineta et al. | 360/99.08 |
| 5,157,295 | 10/1992 | Stefansky et al. | 360/67 R |
| 5,173,814 | 12/1992 | Elsasser et al. | 360/99.08 |
| 5,193,084 | 3/1993 | Christiaens | 360/99.08 |
| 5,210,665 | 5/1993 | Nishizawa | 360/99.08 |

*Primary Examiner*—John T. Kwon
*Attorney, Agent, or Firm*—Edward P. Heller, III

[57] ABSTRACT

A low profile fixed shaft disc drive motor with separate disc mounting and motor sections. The motor is ball staked to a cup shaped piece of sheet metal, which is in turn screwed onto the casing of the disc drive. The motor shaft has an integral lamination mounting flange. The hub has a lower, cup shaped magnet section which has a feature for mounting the discs which is the same length as a disc spacer.

6 Claims, 4 Drawing Sheets

DISC DRIVE SPINDLE MOTOR

BACKGROUND OF THE INVENTION

1. Field of the Invention

This invention relates generally to the field of rigid disc drive data storage devices, and more particularly to an improved spindle motor for spinning the discs on which the data is recorded.

2. Brief Description of the Prior Art

Disc drive data storage devices of the type known as "Winchester" disc drives are well known in the industry. Such devices utilize rigid discs coated with a magnetizable medium for the storage of digital information in a plurality of circular concentric tracks, and this information is written to and read from the discs using a data head mounted on an actuator mechanism which moves the head from track to track under control of electronic circuitry. The discs are mounted for rotation on a spindle motor, and as the discs spin, a thin layer of air is dragged along with the discs and forms an "air bearing" on which the heads fly above the surface of the discs. The integrity of this air bearing is dependent, in part on the cleanliness of the air in the vicinity of the heads and disc, and for this reason, the heads and discs are sealed in a housing to prevent the entrance of contaminants and particles.

The earliest 5" Winchester disc drives included a brushless DC spindle motor which was mounted to the base of the housing with the actual motor components outside the housing and the shaft of the motor projecting into the housing, where a hub, fixed to the shaft, was used to mount the discs.

As industry demands for smaller sizes of disc drives lead to the introduction of half-height 5" units, 3", the size and configuration of the spindle motor has also changed, first to the "pancake" spindle motor—which employed an air gap in the motor which was axial in relationship to the motor shaft—and then to the "in-hub" spindle motor—where the motor coils and magnets which make up the motor were located inside the hub which mounted the discs.

The current generation of 2.5" disc drives continues to use this in-hub configuration of spindle motor, but the inner diameter (ID) of the discs in these drives is only 20 mm. This dimension represents about the lower limit for in-hub motors, since the space required for rotor magnets and stator coils of necessary size to start the discs spinning from rest, and the bearings needed to rotate the hub, occupy virtually all available space.

Disc drives in the 1.8" form factor are currently being introduced in which the ID of the discs is only 12 mm. With such a space limitation, there is not sufficient room within the disc-carrying hub for bearings, magnets and coils to ensure adequate starting torque, particularly if the drive configuration includes multiple discs and heads.

A need clearly exists, therefore, for a spindle motor configuration for 1.8" and future smaller disc drives which can provide necessary starting torque, while still minimizing the physical size of the motor to fit within the small mechanical dimensions of such disc drives.

SUMMARY OF THE INVENTION

The spindle motor of the present invention includes a rotating hub member for mounting the discs in a disc drive which has a portion of larger diameter than the inner diameter of the discs located below the disc-mounting portion which houses the rotor magnets and stator coils. Such a configuration allows these components to be of sufficient size to ensure adequate starting torque for the motor, while still fitting within the dimensional constraints of the form factor.

The spindle motor of the present invention also includes a fixed, non-rotating motor shaft, which contributes to decreased motor "run-out" when this fixed shaft is secured to the top and bottom housing members of the disc drive.

All major components of the spindle motor are made of steel to ensure minimal amounts of differential thermal expansion. The mounting frame of the motor of the present invention is stamped of stainless steel and the fixed shaft is ball-staked to the mounting bracket to eliminate adhesives or welding. The shaft of the motor has a feature incorporated for centering the motor lamination stack relative to the shaft and therefore to the rotor.

It is an object of the present invention to provide a spindle motor for a disc drive of the 1.8" or smaller form factor.

It is another object of the present invention to provide a spindle motor for a 1.8" or smaller disc drive which provides sufficient starting torque to assure proper spin-up of the discs in multiple head/multiple disc configurations.

It is another object of the present invention to provide a spindle motor which minimizes run-out and the effects of differential thermal expansion.

It is yet another object of the present invention to provide a motor which can be assembled without the use of adhesives or welding.

BRIEF DESCRIPTION OF THE DRAWINGS

The spindle motor of the present invention can perhaps be best understood by referring to the accompanying drawings.

DETAILED DESCRIPTION OF THE INVENTION

Figure 1:
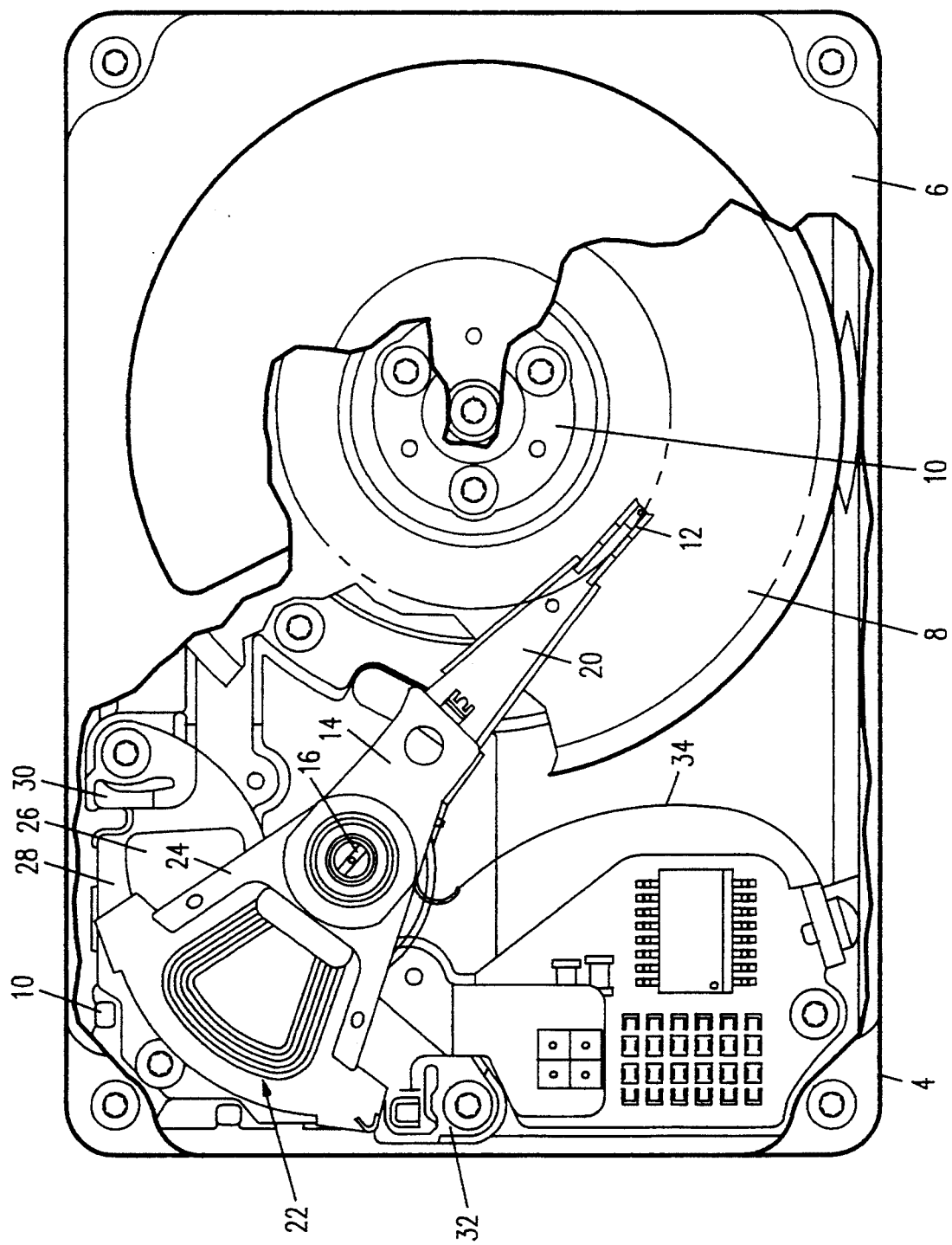
FIG. 1 is a plan view of a disc drive data storage device in which the present invention is particularly useful.

Referring now to the drawings and more particularly to FIG. 1, shown is a plan view of a disc drive 2 in which the spindle motor of the present invention is particularly useful. The disc drive 2 includes a base member 4 to which internal components of the unit are mounted, and which, in company with a top cover member 6, forms a sealed environment for the critical parts of the disc drive 2.

Included in the sealed environment is a plurality of discs 8 which are mounted for rotation on a spindle motor, shown generally at 10. A plurality of heads 12, usually one per disc surface, is mounted to an actuator body 14, which, in the example drive shown, is mounted for pivoting about a pivot shaft 16. The actuator body 14 includes a number of head mounting arms 18 which couple the heads 12 to the actuator body via a plurality of load beam/gimbal assemblies 20. An actuator motor, shown generally at 22, is also coupled to the actuator body 14 to provide motive force to move the heads 12 to any desired position on the surface of the disc 8.

Figure 2:
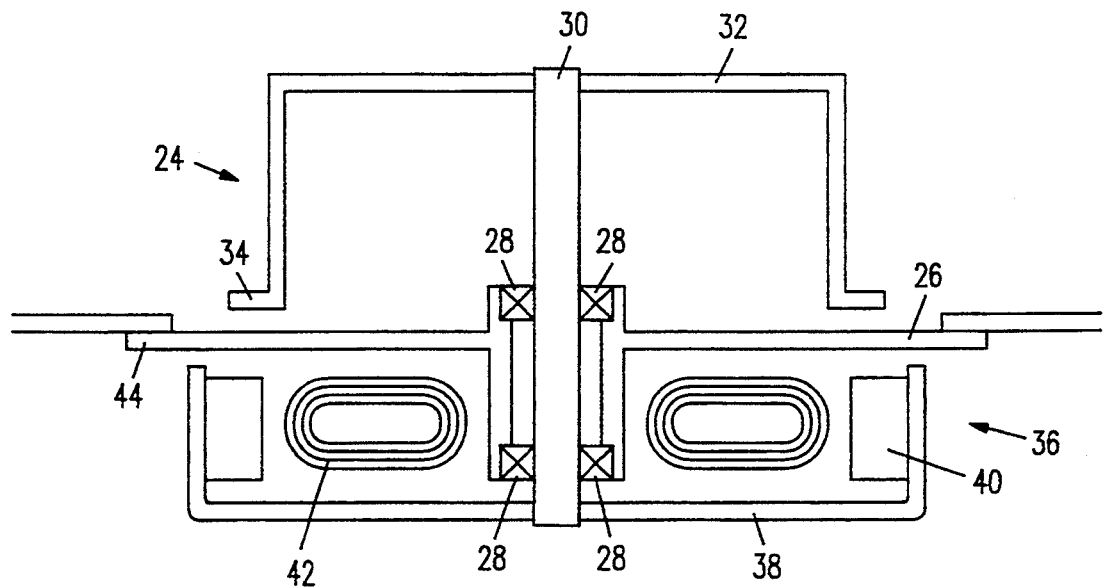
FIG. 2 is a sectional view of a prior art spindle motor configuration.

Turning now to FIG. 2, shown is a sectional view of a prior art spindle motor configuration such as was used in the earliest 5" Winchester disc drives. This motor includes a mounting member 26 which held an arrangement of ball bearings 28 which coupled the mounting member 26 to a motor shaft 30, which in turn was fixedly attached to a disc mounting hub 32. As can be seen in the figure, this disc mounting hub 32 was generally cup-shaped with a flange 34 projecting radially from the open end. This flange 34 was used in conjunction with an arrangement of spacers and a disc clamp (all not shown) to mount the discs (8 in FIG. 1) for rotation. The end of the motor shaft 30 opposite the disc mounting hub 32 was also fixedly attached to a rotor 36 which was made up of magnetically permeable rotor cup 38 and a ring-shaped permanent magnet 40. An arrangement of stator coils 42 was wound around the arms of a stator lamination stack (not shown) which was fixedly attached to the mounting member 26. Properly commutated application of DC current pulses to the stator coils 42 caused rotation of the rotor 36 relative to the mounting member 26, which in turn rotated the disc mounting hub 32 and attached discs (8 in FIG. 1). The mounting member 26 also included a mounting flange 44 which was of a larger diameter than the disc mounting hub 32. This allowed the entire motor 24 to be inserted through an opening in the base member 4 which was larger in diameter than the disc mounting hub, but smaller than the diameter of the mounting flange 44. Screws (not shown) were usually used to attach the motor 24 to the disc drive base member 4.

Figure 3:
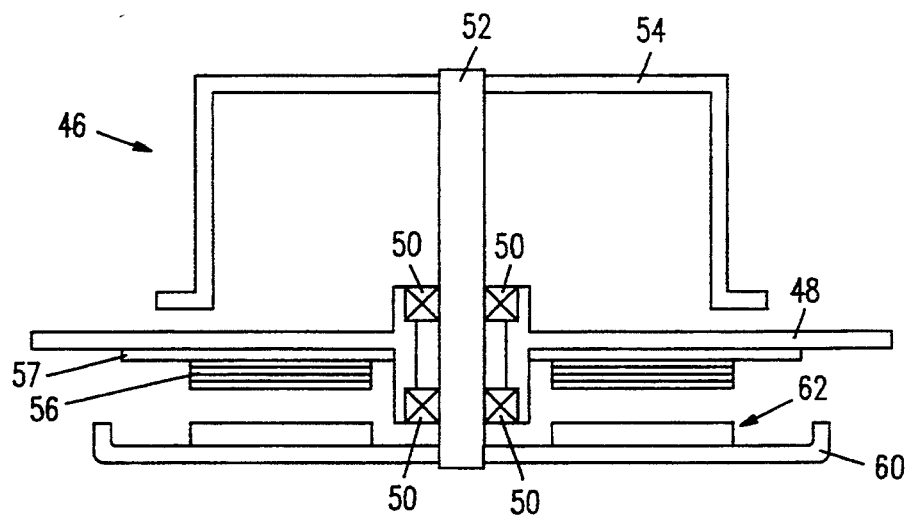
FIG. 3 is a sectional view of a second prior art spindle motor configuration.

A second prior art spindle motor 46 is shown in FIG. 3. This motor 46 also was made up of a mounting member 48, bearings 50, shaft 52 and hub 54 arranged as described above in relationship to FIG. 2. In this configuration, however, the stator coils 56 are mounted flat on a printed circuit card 58. The rotor cup 60 is also flatter and the permanent magnet 62 is mounted on the rotor cup 60 to form an air gap which is axial in relationship to the shaft 52. This type of motor is sometimes referred to as a "pancake motor" because of the relative flatness of the motor components as compared to the configuration of FIG. 2, and was mounted to the disc drive housing as described above in the discussion of FIG. 2.

While the pancake motor of FIG. 2 allowed for a decrease in motor height, and therefore the overall height of the disc drive unit, the configurations of FIGS. 2 and 3 both suffered from similar drawbacks. First, the disc mounting hub in both configurations was attached to the motor shaft at a significant distance from the bearings, and this caused an undesirable amount of wobble or non-repeatable run-out in the motor. This caused difficulties in track following when the density of the data tracks on the discs was increased to raise the capacity of disc drive products. Secondly, the space within the hub was left empty and unused, a luxury which could not be allowed when disc drives of smaller and smaller sizes were designed.

Figure 4:
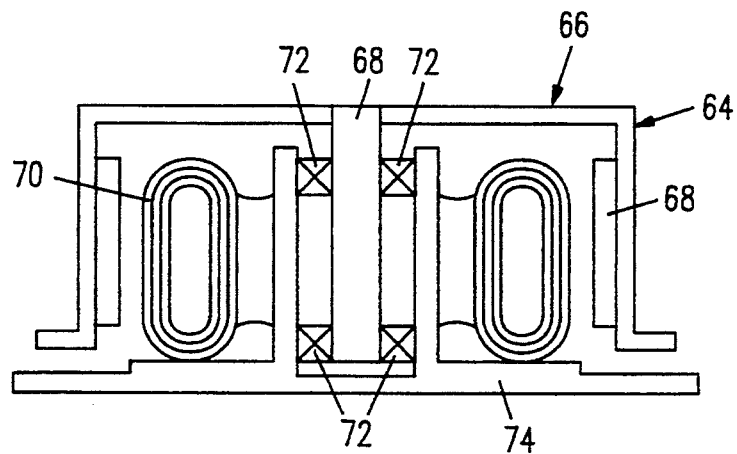
FIG. 4 is a sectional view of a third prior art spindle motor configuration.

The second of these disadvantages was overcome with the introduction of "in-hub" spindle motors, such as the example shown in FIG. 4. In this configuration, the functions of discs mounting and motor rotor were combined into a single rotor/hub 64, made up of a hub 66 and a cylindrical permanent magnet 68 mounted on the inner surface of the hub 66, which was fixedly attached to the motor shaft 68. Stator coils 70, stator lamination stack (not shown) and bearings 72 have all been moved to the upper side of a mounting member 74, which still included a mounting flange 76 which was larger in diameter than the hub 66 for mounting of the motor to the disc drive housing as described above. With such a configuration, virtually all of the motor height could be used to mount discs, thus optimizing the trade off between drive capacity and size.

The first disadvantage cited about the configurations of FIG. 2 and 3 also holds true, though to a lesser extent, with the configuration of FIG. 4. That is, since the only connection between the disc mounting hub and the housing which mounts all other drive components is still made through the bearings and the motor shaft, the hub of the motors can have a tendency to wobble and make accurate writing and retrieval of data to and from the disc difficult, particularly in disc drives with the closely adjacent tracks of current products.

Figure 5:
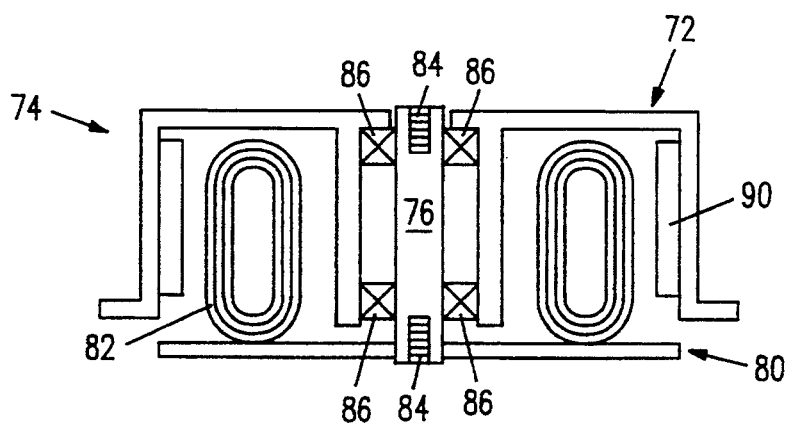
FIG. 5 is a sectional view of a fourth prior art spindle motor configuration.

FIG. 5 shows yet another prior art spindle motor 74 that utilizes the in-hub configuration. A comparison of this motor to the configuration shown in FIG. 4 will reveal, however that the motor of FIG. 5 includes a fixed shaft 76 which does not rotate with the hub 78. Rather, the shaft 76 is fixed in relationship to a base plate 80 which also mounts the stator coils 82. The shaft 76 also includes features, shown as tapped holes 84, for attaching both the top and bottom of the shaft to the base member and top cover of the disc drive housing (not shown). The bearings 86 in this configuration lie between the fixed shaft and an inner cylindrical feature 88 of the hub 78, so that the only moving mass is made up of the hub 78 itself and the permanent magnets 90 attached thereto. This fixed shaft/in-hub motor configuration increases the stability and accuracy of the disc drive by reducing any tendency of the hub 78 to wobble.

The spindle motor configuration shown in FIG. 5 has been used, with minor variations, in disc drive products as small as the 2" form factor. It will be appreciated by a person skilled in the art, though, that if the entire hub diameter is only 20 mm, the mount of space within the hub for motor components has become extremely limited, and further reductions in the size of the discs—and therefore the hub—could easily result in motor components too small to create the necessary starting torque for a disc drive spindle motor.

Figure 6:
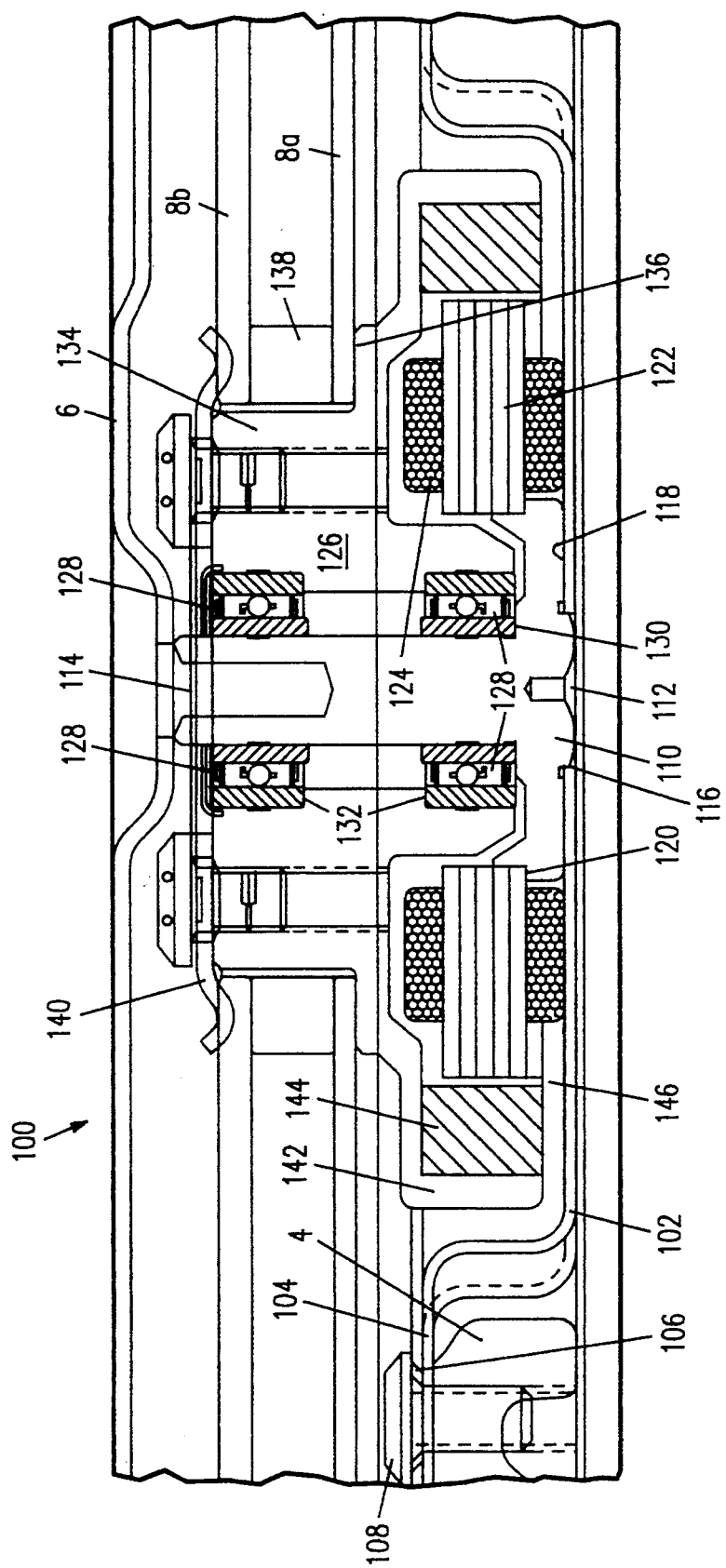
FIG. 6 is a sectional view of the spindle motor of the present invention.

FIG. 6 shows the spindle motor 100 of the present invention in cross-sectional view. The motor is mounted to the base member 4 of the disc drive by a cup-shaped mounting member 102 stamped from stainless steel sheet. The mounting member 102 includes a peripheral flange 104 in which holes (one shown at 106) are provided for attachment of the motor to the disc drive base member 4 by screws 108.

The motor shaft 110 is also formed of stainless steel and is machined with a stepped hole 112 in the bottom of the shaft 110 and a tapped hole 114 in the top of the shaft 110. The stepped hole 112 is used in the process of joining the shaft 110 to the mounting member 102. The mounting member has a hole 116 whose diameter is substantially the same as the outer diameter of the bottom of the shaft 110. To join the two components, the bottom of the shaft 110 is placed into the hole 116 in the mounting member 102 until the mounting member 102 rests against a flat surface 118 near the bottom of the shaft 110, and a ball of slightly larger diameter than the stepped hole 112 is driven into the stepped hole 112. This action causes the bottom of the shaft 110 to expand and become tightly engaged with the mounting member 102. Since both of these components are made of stainless steel, this engagement cannot loosen due to the effects of differential thermal expansion. The tapped hole 114 in the top of the shaft 110 is used to receive another screw (not shown) to anchor the top of the shaft 110 to the top cover 6 of the disc drive in order to minimize wobble in the motor assembly.

The shaft 110 also includes a first annular surface 120 which is used to position and align a stack of stator laminations 122 which are wound with stator coils 124 in a manner well known in the industry. Since the laminations 122 are formed of steel also, the relative position of the stator to the shaft 110 will remain stable even over expected variations in the operating temperature of the disc drive.

The motor also includes a stainless steel hub 126 which is attached to the shaft 110 via ball bearings 128. As can be seen in the figure, the shaft 110 has a second annular surface 130 against which the inner race of the lower bearing 128 comes to rest upon assembly, while the hub 126 includes a stepped central bore which forms a pair of step surfaces 132 which provide a precise spacing mechanism for the outer races of the bearings 128. Again, since the bearing races, shaft 110 and hub 126 are all stainless steel, the effects of temperature changes are minimized.

The hub 126 includes a disc mounting portion 134. At the lower part of this disc mounting portion 134 is a disc mount surface 136. The first disc 8a to be mounted on the spindle motor 100 will come to rest on this disc mounting surface 136, and subsequent discs will be separated from each preceding disc by a disc spacer 138, until the final disc 8b in the disc drive is installed, at which time a disc clamp 140 is installed to secure the stack of discs to the hub 126. It should be noted that the diameter of the outer edge of the disc mounting surface 136 is approximately the same as the outer diameter of the disc spacer 138, and that the outer surface of the hub 126 falls away from the first disc 8a installed to allow a data head operating on the lower surface of the first disc 8a to move into the same radial positions as the heads operating on the other disc surfaces.

The hub 126 further includes a downward-extending, cup-shaped rotor portion 142, on the inner surface of which is mounted a permanent magnet 144. A radial air gap 146 exists between the outermost extreme of the stator laminations 122 and this permanent magnet 144. It can be clearly seen that the energizing components of the motor—i.e., the stator and rotor—have a much larger diameter than the disc mounting portion 134 of the hub, and that the mechanical size of the stator and rotor can thus be optimized to produce a larger amount of motor power than would similar components confined to the dimensional constraints of the inner diameter of the disc 8.

Forming the mounting member 102, shaft 110, bearings 128, stator laminations 122 and hub 126 all of stainless steel allows the motor to be assembled using mostly press-fitting and minimizes the effects of thermal variation on the relative position of the motor components and thus improves the overall reliability of the entire disc drive.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

We claim:
1. A disc drive motor comprising:
a fixed cylindrical shaft having a ball staking recess at one end;
a shaft flange integral with said shaft adjacent said one end but spaced therefrom a short distance to define a lip;
motor laminations mounted on said flange;
a sheet of metal having aperture approximately the same diameter as said shaft;
said one end of said shaft being inserted into said aperture and ball staked thereto by means of said ball staking recess;
the length of said lip being approximately the same as the thickness of said metal sheet such that when said one end is inserted into said aperture to the point where the flange abuts the sheet of metal, said one end of said shaft does not protrude beyond the plane of the other side of said sheet of metal;
said sheet of metal further including a plurality of mounting screw apertures; and
a disc drive casing having a plurality of screw holes corresponding to the screw holes in said sheet metal:
the combined assembly of shaft, laminations and sheet metal being mounted on said disc drive casing by means of screws through the respective screw holes.

2. The motor of claim 1 further including
upper and lower bearings, each having inner and outer races; and
said flange has a feature means for abutting against the inner race of the lower bearing but not the outer race.

3. The motor of claim 2 further including a hub having feature means for abutting against the topmost edge of the lower and bottom-most edge of the upper outer races of the upper and lower bearings.

4. The motor of claim 2 further including a hub mounted on the outer races of said bearings, the hub including
a disc mounting section;
an integral hub flange having
a first section extending from the hub a distance approximately equal to the width of a disc spacer;
a second section extending diagonally away from the first section and the disc mounting section;
a third section forming a open cup directed away from the disc mounting section.

5. The motor of claim 4 further included a circular magnet mounted inside said cup shaped section.

6. The motor of claim 5 wherein said shaft flange has a feature; and wherein said motor further includes
motor laminations mounted on said feature;
said shaft feature and said hub flange cup shaped section arranged such that said magnet and said laminations are operatively adjacent.

* * * * *

UNITED STATES PATENT AND TRADEMARK OFFICE
CERTIFICATE OF CORRECTION

PATENT NO. : 5,400,197
DATED : March 21, 1995
INVENTOR(S) : Iraj Jabbari and Michael J. Darling It is certified that error appears in the above-indentified patent and that said Letters Patent is hereby corrected as shown below:

Title page:
Item [75]: Inventors: delete "Ira J.", insert --Iraj--.

Signed and Sealed this

Eleventh Day of July, 1995

Attest:

BRUCE LEHMAN

Attesting Officer

Commissioner of Patents and Trademarks